Jan. 2, 1940.   J. SCHUBERT   2,185,902
ARTICULATING ROD BEARING FOR RADIAL MOTORS
Original Filed Oct. 31, 1936   2 Sheets-Sheet 1

Inventor
Julius Schubert

Jan. 2, 1940.  J. SCHUBERT  2,185,902
ARTICULATING ROD BEARING FOR RADIAL MOTORS
Original Filed Oct. 31, 1936   2 Sheets—Sheet 2
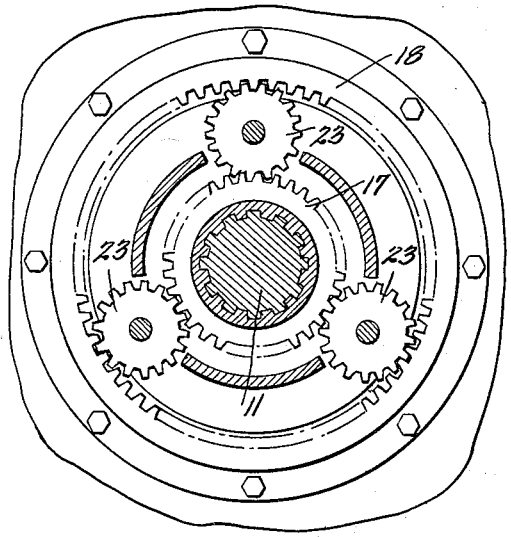
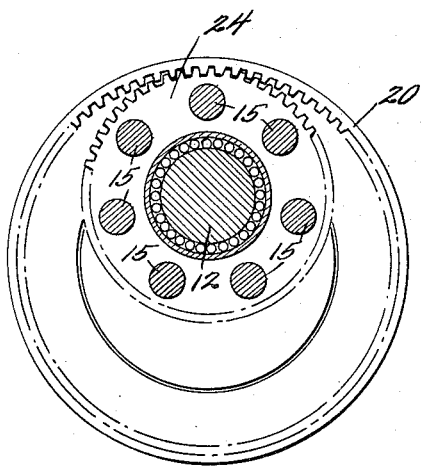
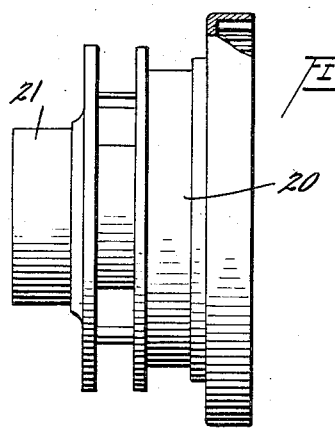
Inventor
Julius Schubert Patented Jan. 2, 1940

2,185,902

UNITED STATES PATENT OFFICE 2,185,902

ARTICULATING ROD BEARING FOR RADIAL MOTORS

Julius Schubert, Sunnyside, N. Y.

Application October 31, 1936, Serial No. 108,673
Renewed February 2, 1938

4 Claims. (Cl. 121—120)

This invention relates to articulating rod bearings for radial internal combustion engines and aims to provide a greatly improved geared bearing which will retain the same position relative to the various cylinders during the rotation of the crank shaft. The idea is to provide a well balanced and rugged connecting rod and bearing assembly in which a simple system of planetary gearing maintains the bearing in a predetermined angular position.

Other objects of the invention will appear in the specification, when considered in connection with the accompanying drawings, wherein:

Fig. 2 is a section on the line 2—2 of Fig. 1;

Fig. 3 is a section on the line 3—3 of Fig. 1; and

Fig. 4 is a side elevation of a master ring gear.

Figure 1:
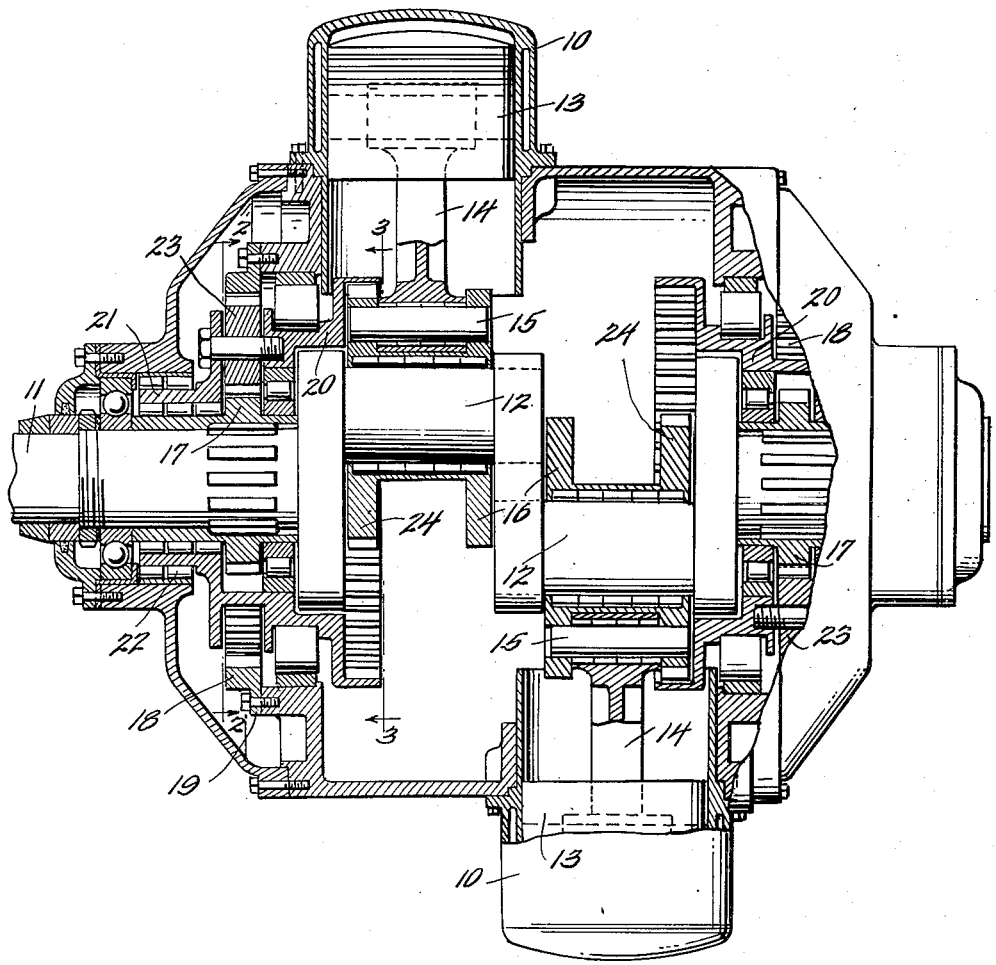
Figure 1 is a vertical sectional view, partly in elevation, showing the preferred form of bearing applied to a radial engine.

Referring to the drawings, the motor is shown as having two rows of radial cylinders 10 of which there may be any desired number in each row. The engine has the usual crankshaft 11 with two crank pins 12. The pistons 13 have the usual articulating or connecting rods 14 each connected to a bearing pin 15 on a connecting rod bearing or hub 16 carried by each of the crank pins.

A spur gear 17 is secured to the forward end portion of the crankshaft inside the crank case. An internal ring gear 18 has an annular flange 19 bolted on the crank case and extends around the gear 17. A master ring gear 20 has a hub extension 21 in the form of a stepped cylindrical sleeve mounted in the outer crankshaft bearing 22. This sleeve has both external and internal bearings in the crank case and on the crankshaft. This ring gear sleeve is slotted and carries planetary gears 23 meshing with the ring gear 18 and the spur gear 17. The gear ratio between the spur gear and the planets preferably ranges between 2 to 1 and about 4 to 1, depending upon the throw of the cranks and other factors.

The stationary ring gear 18 imparts rotation to the master ring gear 20 and the master ring gear has internal teeth which mesh with an external gear 24 on the connecting rod bearing or hub member 16. The gear ratio between the hub gear 24 and the master internal gear which rotates in the same direction is preferably about 3 to 1. The arrangement is such that the gears maintain the hub or connecting rod bearing always in the same relative angular position.

When the motor is running the thrust of the explosions is transmitted directly to crank pin through the hub and the meshing gears maintain the parts in their proper positions. By slightly turning the gear 24 relative to the ring gear 25 or making an adjustment of the large ring gear 18, the articulating rods may be so arranged as to lag behind the dead centers, whereby the explosion pressure on each power stroke is converted into turning thrust to increase the power efficiency of the engine. That is to say, the gears may be so arranged as to eliminate loss of power which ordinarily results when the articulating rod connections pass their usual dead centers.

From the foregoing description, it will be seen that the simplified planetary gearing is very simple, compact and rugged in its construction. It is very effective in operation, especially in engines of great horse power. The connection to the hub can be adjusted by the simple expedient of turning the ring gear 18 to position the articulating rods and pistons properly. Furthermore, the master ring gear may be extended and used to drive a power shaft at a reduced speed. Moreover, planetary gearing of this type may be employed on the crank-shaft bearing between two circular rows of offset cylinders to produce true motions for both sets of pistons. Also, the gearing may easily be adjusted by changing the angular position of the ring gear 18 to vary the positions of the pistons and thereby change the compression ratio. Thus, the invention eliminates the necessity of using master connecting rods which have proved to be highly objectionable on account of excessive, unbalanced vibration forces.

Obviously, the invention is not limited to the particular embodiment thereof, herein shown and described.

What I claim is:

1. In a radial engine of the class described, a crank pin having a geared hub bearing; articulating rods connected to the hub; an external gear on the crank shaft; an internal ring gear secured to the engine housing; a master ring gear meshing with said hub gear; and a plurality of planetary gears carried by said master ring gear and meshing with said crank shaft gear and said stationary ring gear to maintain the hub always in the same angular position.

2. In a radial engine of the class described, a crankshaft having a crank pin; a hub on the crank pin; a plurality of connecting rods connected to the hub; a spur gear on the hub; an internal ring gear meshing with said spur gear; a gear fixed on the crankshaft; a stationary internal ring gear opposite said crankshaft gear;

and planetary driving gears carried by said first named ring gear and meshing with said stationary ring gear and said crankshaft gear.

3. In a radial engine of the class described, a crankshaft having a crank pin; a hub on the crank pin; a plurality of connecting rods connected to the hub; a spur gear on the hub; an internal ring gear meshing with said spur gear; a gear fixed on the crankshaft; a stationary internal ring gear adjustably secured to the engine housing; and a series of planetary gears carried by said first named ring gear and meshing with both of said last named gears to retain the connecting rods in their true positions.

4. In a radial engine of the class described, a crankshaft having a crank pin; a hub on the crank pin; and planetary gearing connecting said hub to the crankshaft including a fixed ring gear removably secured to the engine housing.

JULIUS SCHUBERT.